US 6,994,443 B2

(12) United States Patent
Schuurmans et al.

(10) Patent No.: US 6,994,443 B2
(45) Date of Patent: Feb. 7, 2006

(54) VEHICLE EXTERNAL MIRROR WIRING INTEGRATION

(75) Inventors: Maarten Johannes Schuurmans, Kingswood (AU); Robert William Gilbert, Willunga (AU)

(73) Assignee: Schefenacker Vision Systems Australia Pty Ltd., Lonsdale (AU)

( * ) Notice: Subject to any disclaimer, the term of this patent is extended or adjusted under 35 U.S.C. 154(b) by 5 days.

(21) Appl. No.: 10/473,459

(22) PCT Filed: Mar. 26, 2002

(86) PCT No.: PCT/AU02/00352

§ 371 (c)(1),
(2), (4) Date: Sep. 26, 2003

(87) PCT Pub. No.: WO02/076791

PCT Pub. Date: Oct. 3, 2002

(65) Prior Publication Data

US 2004/0090690 A1    May 13, 2004

(30) Foreign Application Priority Data

Mar. 26, 2001 (AU) .................................. PR3953
Mar. 26, 2001 (AU) .................................. PR3955

(51) Int. Cl.
*G02B 7/182*    (2006.01)

(52) U.S. Cl. ..................................... 359/872; 248/479
(58) Field of Classification Search ................ 359/841, 359/872, 877; 248/476, 479
See application file for complete search history.

(56) References Cited

U.S. PATENT DOCUMENTS 6,382,804 B1 * 5/2002 Lang et al. .................. 359/872
6,483,048 B1 * 11/2002 Bontrager et al. .......... 200/5 R

FOREIGN PATENT DOCUMENTS

DE          297 22 304 U1    5/1998
WO          WO 00/46072 A    8/2000

* cited by examiner

*Primary Examiner*—Mark A. Robinson
*Assistant Examiner*—Alessandro Amari
(74) *Attorney, Agent, or Firm*—Warn, Hoffmann, Miller & LaLone, P.C.

(57) ABSTRACT

A vehicle external mirror assembly (10) comprising a mirror head (30) adapted to support a mirror, the mirror head (30) having an external shell (36), a first foam core (37) providing support for the shell (36), a mirror base (20) adapted for mounting to a vehicle, the mirror base (20) connected to the mirror head (30) or integral with the mirror head (30) and a plurality of electrical conductors (32) disposed within the first foam core (37), the conductors (32) are arranged and constructed to diffuse stress within the foam core (37).

12 Claims, 7 Drawing Sheets

VEHICLE EXTERNAL MIRROR WIRING INTEGRATION

The present invention relates to vehicle external mirrors an in particular to vehicle external mirrors having an external shell supported by a foam core.

Many different mirror housing assemblies constructions are known. A new mirror construction is disclosed in the applicant's earlier International Patent Application No PCT/AU00/00054. The invention disclosed in the above-mentioned International application uses a thin moulded external plastic shell in conjunction with a foam core to form a mirror housing or mirror head. In order to reduce weight and cost, it is desirable to reduce the foam density. At lower densities however, stresses within the foam can cause excessive deformation or breakdown of the foam. A solution to this problem is provided by the applicant's above-mentioned International application which discloses a load diffuser extending laterally into the foam core. Such a load diffuser enables reduction of stresses within the foam.

Mirror assemblies and in particular mirror heads must be capable of withstanding significant loads. For instance a person may lean on the mirror head or the mirror head may strike an object (such as a post).

Mirror head designs vary considerably from simple arrangements where the base and head are effectively a single component, to mirror assemblies where the base and the head are separated by one or more narrow necks, and finally to mirror assemblies where the head is pivotable with respect to the base.

Controlling stresses within mirrors relying on foam for support is important to avoid local crushing of the foam. While problems can arise with all mirror assembly configurations, the problem becomes more acute where there are necked regions and where pivot connectors are used to allow the head to pivot with respect to the base.

Modern external mirrors require power to drive motors that control the mirror glass angle. Power may also be required for other features such as indicator or other lights. Wiring harness that connect to the main vehicle, wiring harness are typically used to deliver power to sites within external mirrors. Where a pivoting mirror head is used, the mirror wiring harness is routed through a hole through the centre of a pivot spigot.

It is desirable that pivot mechanisms be as compact as possible and as self contained as possible so that assembly of a mirror is facilitated and that portion of a mirror assembly taken up by the pivot is as small as possible.

It is also desirable in many mirror configurations that the mirror sweep over the pivot mechanism and hence having a pivot mechanism as small as possible is also desirable.

Provision of a mirror wiring harness and the need to accommodate such a harness within and through the mirror assembly adds complexity and cost to the mirror assembly.

It is an object of the invention the overcome or ameliorate at least some of the above problems.

It is an object of the invention to provide a mirror assembly of reduced complexity.

It is a further object of the invention to integrate at least some of the components.

SUMMARY OF THE INVENTION

According to a first aspect of the invention, there is provided a vehicle external mirror assembly comprising:
a mirror head adapted to support a mirror, the mirror head having an external shell;
a first foam core providing support for the shell;
a mirror base adapted for mounting to a vehicle, the mirror base connected to the mirror head or integral with the mirror head; and
a plurality of electrical conductors disposed within the first foam core,
wherein the conductors are arranged and constructed to diffuse stress within the foam.

Preferably the electrical conductors are elongate metal strips.

The invention can be applied to both fixed head external mirrors or to external mirrors that have a head that is pivotable with respect to a base.

Preferably, where a fixed head mirror assembly is used, the assembly further comprises a neck connecting the mirror head and mirror base together, wherein the foam core and the electrical conductors extend through the neck.

Preferably, where a pivotable head mirror assembly is used, the assembly further comprises a pivot assembly connecting the mirror head and mirror and mirror base together for respective pivotable movement,
wherein in use the conductors act to diffuse load from the pivot assembly into the foam.

Preferably the assembly further comprises a means for electrically connecting the conductors disposed within the foam core to conductors within the mirror base.

Preferably the pivot assembly further comprises a base portion and a head portion having mutually shaped ramped surfaces which act to provide a detent mechanism and which provide the means for electrical connecting the conductors disposed within the foam core to conductors within the mirror base as to allow electrical power transmission through the pivot assembly.

According to the second aspect of the invention, there is provided a vehicle mirror assembly having:
a mirror base adapted for mounting to a vehicle;
a mirror head adapted to support a mirror; and
a power transmission assembly for transmitting power between a vehicle wiring harness terminator adjacent the mirror base and an electrical component within the mirror head, the power transmission assembly having at least two power lines,
each power line comprising:
a central elongate power transmission portion;
a first termination portion extending from the power transmission portion and adapted to connect to the wiring harness terminator; and
a second termination portion extending from the power transmission portion and adapted to connect to the electrical component,
wherein each power line is a continuous metal component.

According to the third aspect of the invention, there is provided a vehicle mirror assembly having:
a mirror base adapted for mounting to a vehicle;
a mirror head adapted to support a mirror;
a pivot assembly connecting the mirror head and mirror base together for respective pivotal movement; and
a power transmission assembly for transmitting power between a vehicle wiring harness terminator adjacent the mirror base and an electrical component mounted to the mirror head, the power transmission assembly having at least two power lines, each power line comprising a base segment and a head segment,
each base segment comprising: a first power transmission portion; and a first termination portion extending from the first power transmission portion and adapted to connect to the wiring harness terminator, each head segment comprising:

a second power transmission portion; and a second termination portion extending from the second power transmission portion and adapted to connect to the electrical component, wherein each segment is a continuous metal component.

According to the fourth aspect of the invention, there is provided a vehicle mirror assembly having:

a mirror base adapted for mounting to a vehicle;

a mirror head adapted to support a mirror; and a pivot assembly connecting the mirror head and mirror base together for respective pivotal movement, the pivot assembly comprising:

a base portion adapted to be joined to the mirror base;

a head portion adapted to be joined to the mirror head;

a spring assembly;

a pivot pin extending through the base portion and the head portion such that the head portion can rotate with respect to the base portion about the pivot pin; and inter-engaging detent arrangements on the base portion and the head portion, the spring assembly loading the detent arrangement, characterised by the pivot pin being a solid pin.

Specific embodiments of the invention will now be described in some further detail with reference to and as illustrated in the accompanying figures. These embodiments are illustrative, and are not meant to be restrictive of the scope of the invention.

DETAILED DESCRIPTION OF A PREFERRED EMBODIMENT OF THE INVENTION

A preferred embodiment of the invention is illustrated in the accompanying figures in which:

FIGS. 4b and 4c show an alternative sub-assembly to that shown in FIG. 4a.

Figure 1:
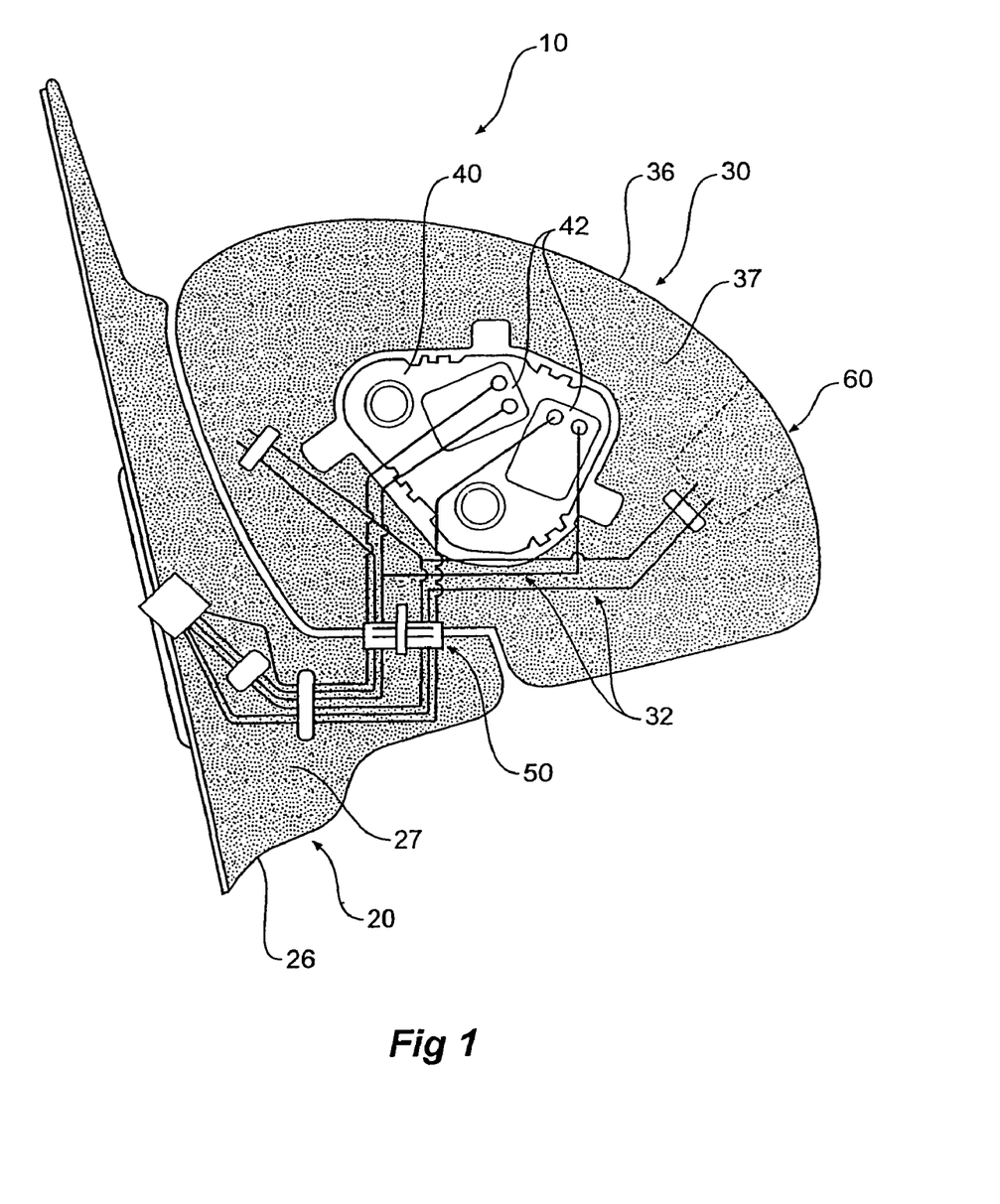
FIG. 1 shows a schematic view from the rear of a vehicle external mirror assembly in accordance with a first embodiment of the invention.
Figure 7:
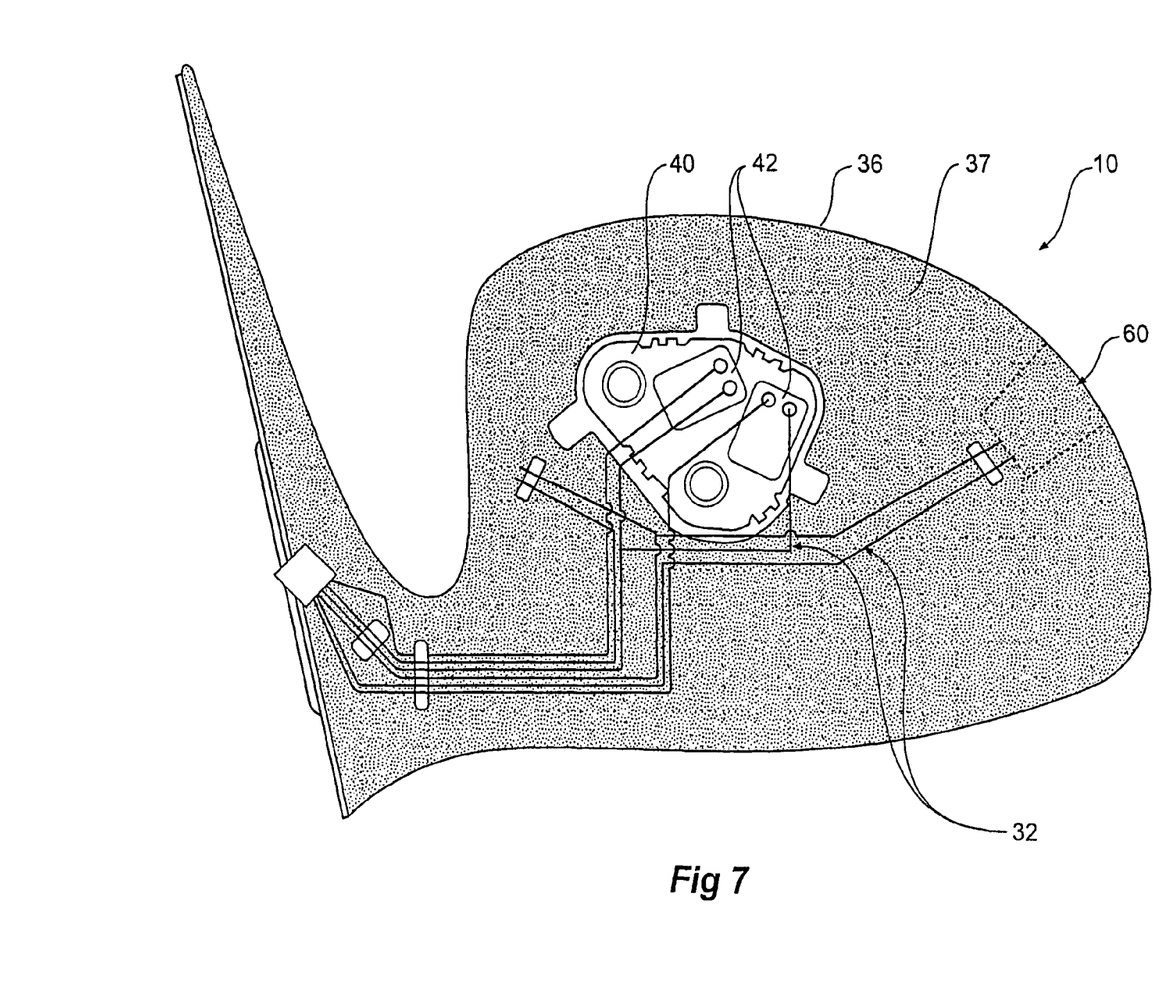

FIG. 7 in a schematic view from the rear of a vehicle external mirror assembly in accordance with a second embodiment of the invention Referring to FIG. 1, a vehicle external mirror assembly 10 comprises a head 30 mounted to a base 20. A pivot connector 50 is provided to connect the base 20 to the head 30 in such a way as to allow respective pivotal movement.

Figure 6:
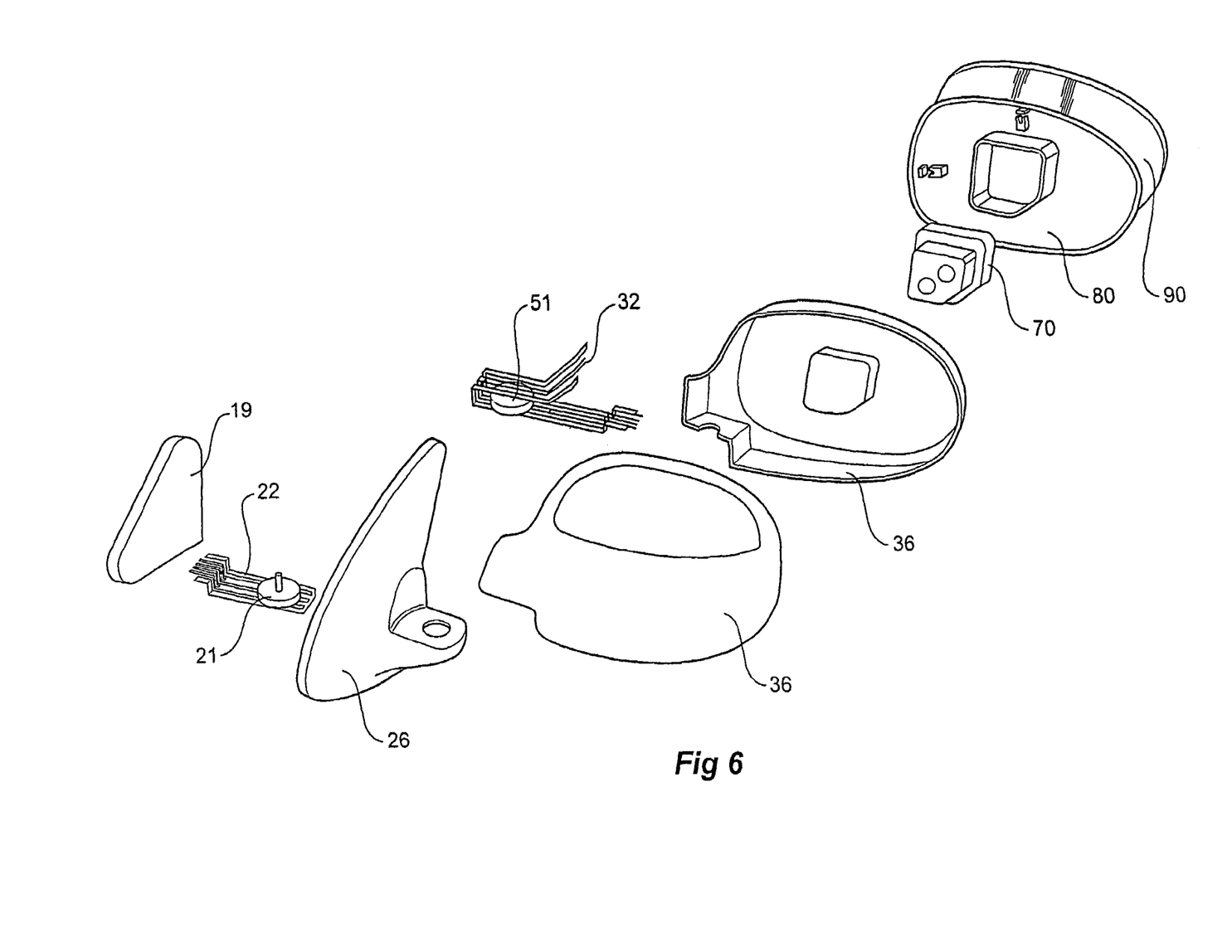
FIG. 6 shows an exploded view of the assembly of FIG. 1.

The mirror head 30 comprises an external shell 36 which is filled with foam 37. A motor mechanism 40 is held within the mirror head 30 by the foam 37. The motor mechanism 40 supports a mirror (not shown) and provides a means for changing the angle of the mirror with respect to the head. More specifically, motors 42, powered by the electrical system of the vehicle, drive the mirror about substantially horizontal and substantially vertical axes to enable the driver to adjust his or her rear view. FIG. 6 shows an exploded view of the final assembly.

The mirror head 30 is also provided with an electrical accessory receptacle 60. This receptacle is provided for housing lights or other accessories. For instance, a signal light, a vehicle security light, a remote transaction interface system, componentary for a global positioning system navigational aid, a video camera and/or a proximity sensing device such as a radar.

Figure 3:
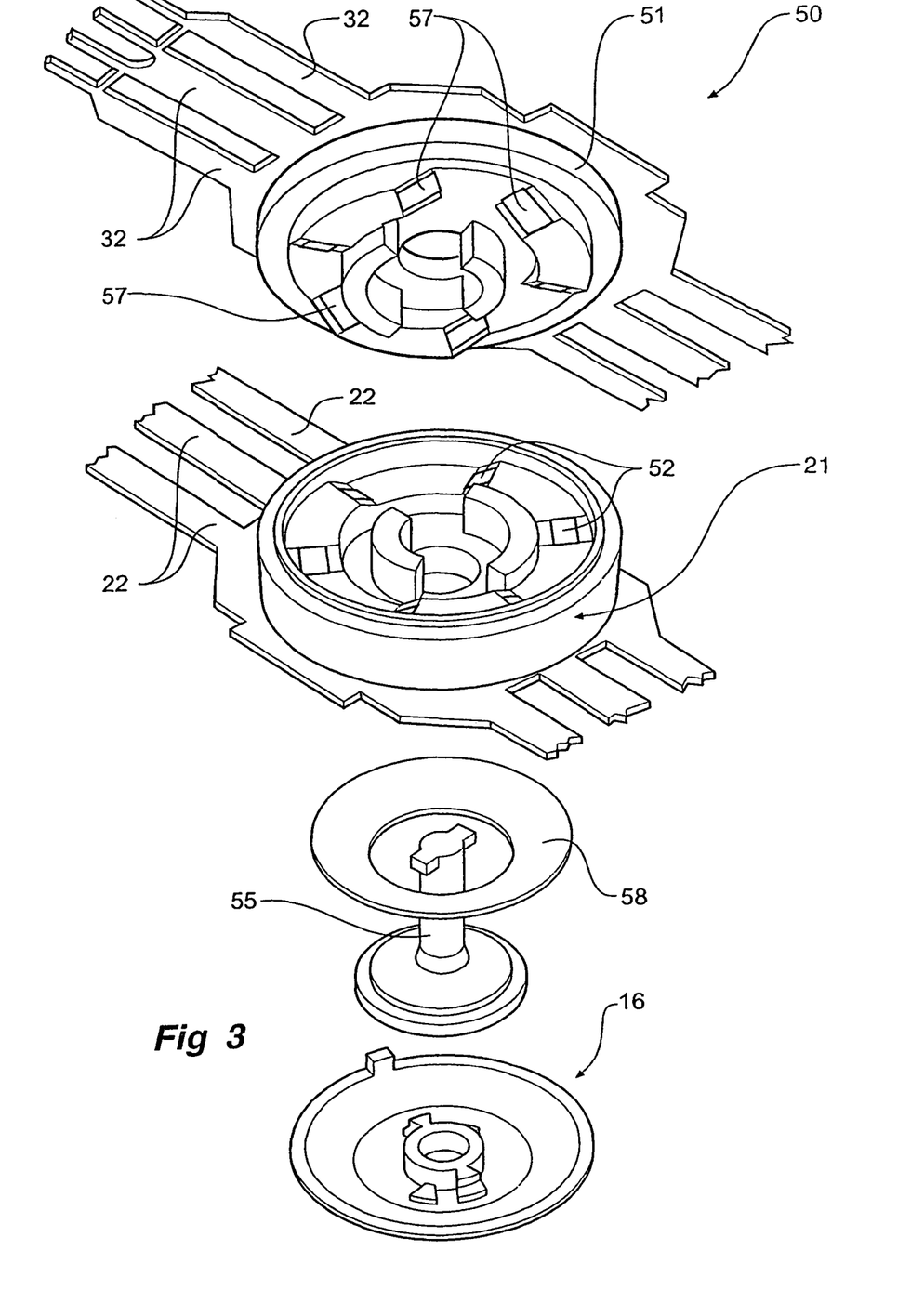
FIG. 3 shows further details of the pivot assembly of FIG. 2 in an exploded perspective view.

Extending from the pivot connector 50 are electrical conductors 22 and 32 as shown in FIGS. 1 and 3. These electrical conductors perform two functions. Firstly they carry power to electrical components within the mirror head (including the motors 42 within motor mechanism 40) and secondly they diffuse stress within the foam 27. This is particularly important in the area of the pivot connector 50.

Conductors 22 and 32 are made from material which are both electrically conductive and have some rigidity. This enables them to transmit loads from the foam to the connector 50 in such a way as to prevent excessive stress concentrations occurring within the foam 27 and 37. The electrical conductors 22 and 32 also obviate the need for wiring harnesses and associated passages or conduits through the foam 27 and 37 within the mirror base 20 and mirror head 30.

The electrical conductors 22 and 32 are in the form of pressed metal flat strips or bars.

Conductors having cross-sections with a large bearing surface interface with the foam are preferred. This assists with reducing maximum stress levels within the foam and provides for good adhesion to the foam.

Figure 2:
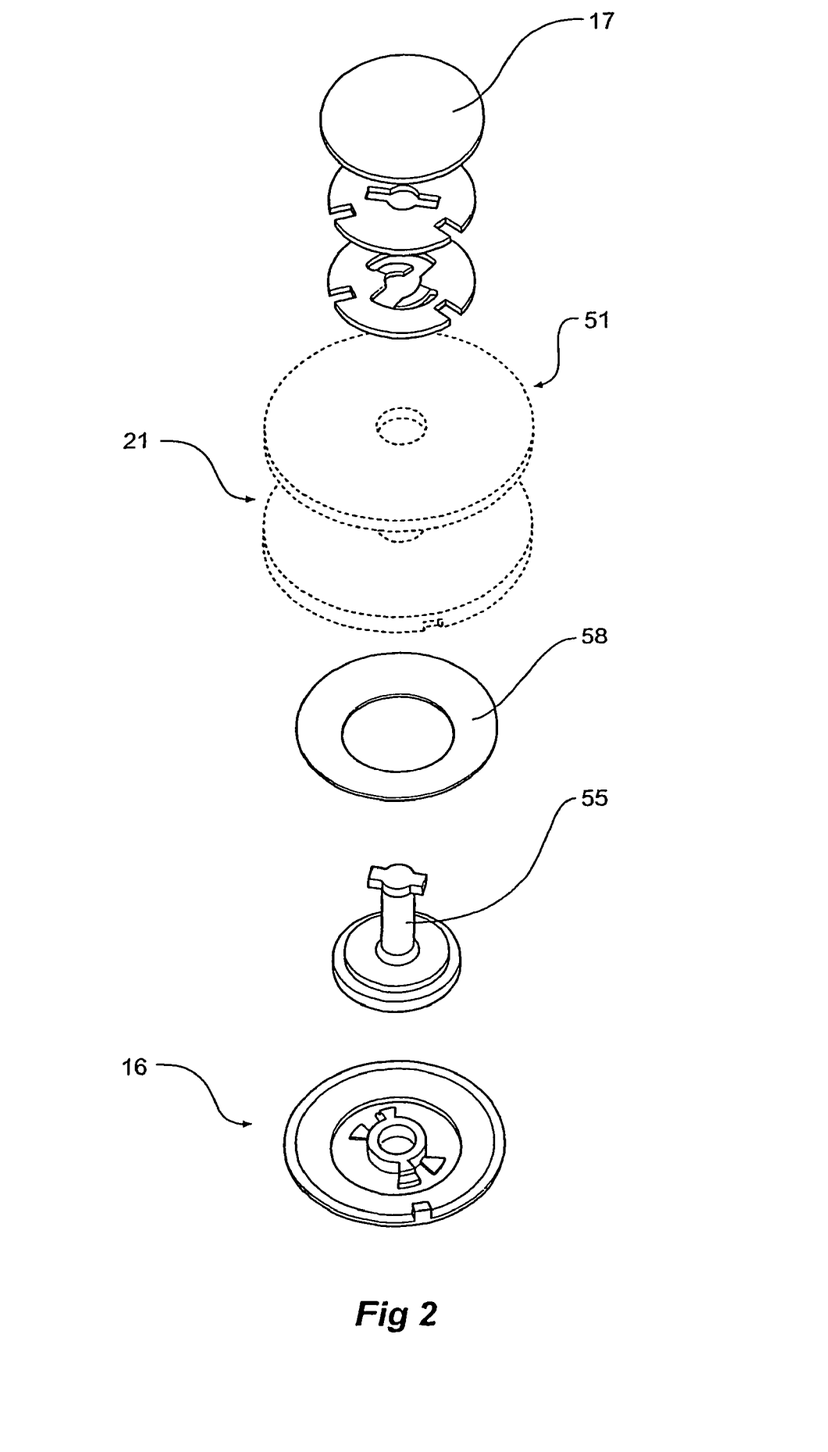
FIG. 2 shows the pivot assembly of the mirror assembly of FIG. 1 in an exploded view.

Referring to FIG. 2, caps 16 and 17 are provided to prevent foam entering the pivot connector 50. The electrical conductors 22 and 32 are omitted from FIG. 2 for clarity.

Referring to FIG. 3, it can be seen that pivot connector 50 comprises four main components being: an upper disc 51, lower disc 21, a shaft 55 and a disc spring 58. Electrical conductors 32 and 22 extend from the upper disc 51 and lower disc 21 respectively. The orientation and length of the conductors 32 and 22 will depend on the size and shape of the specific mirror assembly. Correctly orientated, conductors 32 and 22 will diffuse loads from the pivot connector 50 into the foam 27 and foam 37 of the base and head respectively.

Figure 4A:
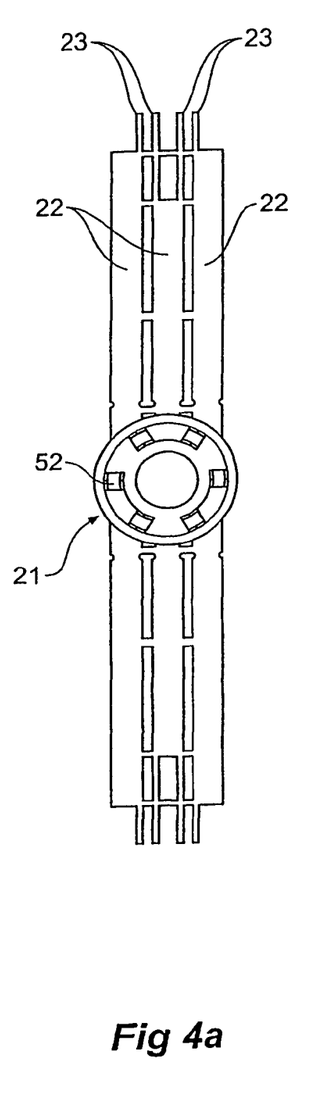
FIG. 4a, shows a sub-assembly of the assembly of FIG. 1.
Figure 4B:
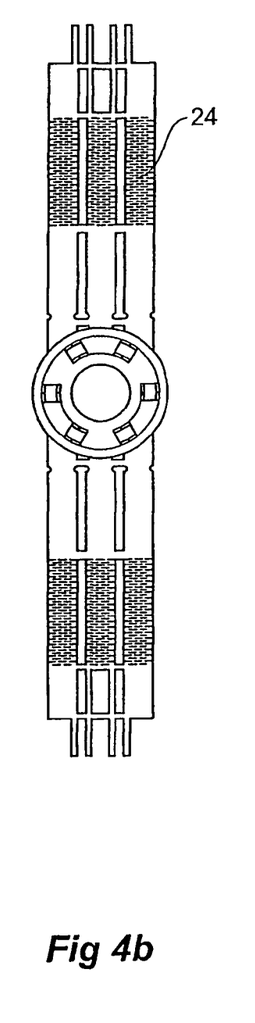
Figure 4C:
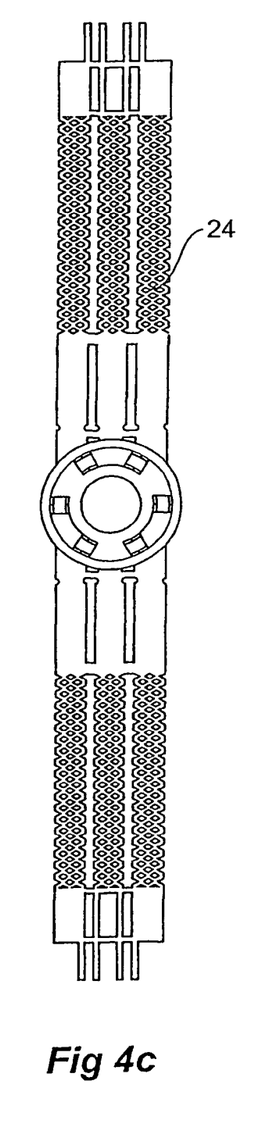

FIGS. 4a, 4b and 4c show a subassembly of conductors having perforations which enable the length of the conductors to be varied to suit a particular application. FIG. 4c shows the conductor in a stretched condition. The perforations (shown in FIGS. 4b and 4c) are positioned away from the pivot connector to ensure that the conductors flexibility reduces away from the pivot axis in the final assembly. Electrical conductors 22 terminate in ends 23. These ends are shaped to be compatible with standard automotive electrical connector plugs.

Electrical connection between the conductors 32 and conductors 22 is provided by ramped surfaces such as those indicated at 57 and 52 in FIG. 3. These ramped surfaces also provide a detent mechanism to hold the upper and lower disc 51 and 21 in a constant angle of position in the in use position. When the mirror is "broken away" or "parked" relative rotation between the upper disc 51 and lower disc 21 occurs. As this rotation occurs, the two components also move axially as they slide against their ramped surfaces.

In the broken away or parked position, electrical connection between conductors 32 and 22 is lost. This is not considered a problem as there will normally be no need to activate any of the electrical components within the mirror head 30 when the mirror is in a broken away or parked position. When the mirror is returned to a deployed or in use position, the sliding action of one ramped surface against another will assist in maintaining a good electrical connection between the two surfaces.

This detent/electrical connection design obviates the need for a wiring harness and the associated wiring harness conduit which would normally require a hollow cylindrical pivot pin connecting the upper and lower discs 51 and 21. By allowing the use of a solid pivot pin, such as that shown at 55 in FIGS. 2 & 3, the design enables a more compact modular pivot to be achieved.

Figure 5:
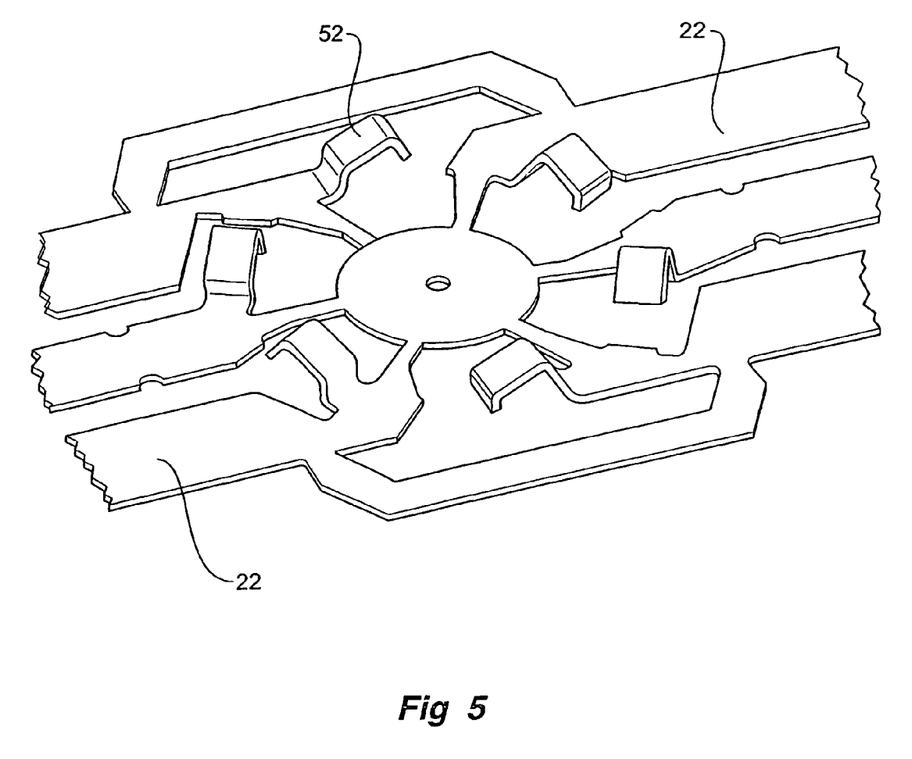
FIG. 5 shows a sub-assembly of the assembly of FIGS. 4a, 4b and 4c.

One form of construction of the mirror assembly 10 shown in FIG. 1 is as follows. A blank of sheet metal is stamped and then pressed into the shape shown in FIG. 5. To provide stability for this subassembly, the conductors 22 and 32 are, at this stage, joined. At a later stage in the manufacturing process, further stamping or cutting can occur to separate the electrical conductors.

Referring to FIG. 4*a*, lower disc 21 is "insert moulded" around conductors 22 and 32. Ramped surfaces 52 are left exposed. An alternative arrangement is shown in FIG. 4*b* in which perforations 24 are made within the conductors 22 (most conveniently before insert moulding). With this alternative the conductors 22 are stretched away from the central lower disc 21 to extend the length of the conductors (as shown in FIG. 4*c*) to match the mirror assembly into which they are to be fitted. With this construction the stiffness of the diffuser reduces away from the pivot axis.

FIG. 6 shows the mirror assembly 10 in an exploded drawing.

The construction and method of manufacture of the mirror assembly 10 incorporating the conductors 22 and 32 may take a number of forms. For instance, thin external shells 26 and 36 may be used with foam cores 27 and 37 being provided to both support and anchor the shells. With this construction, the thickness can be such that, in an unsupported form, the shell could be depressed or flexed with even quite light pressure. Portions of the shell could also be simply a film-like material that simply provides a covering for the foam. Details of these and other mirror improvements and methods of manufacture improvements are disclosed in the applicant's earlier applications; International Application No's. PCT/AU00/00054 and PCT/AU01/00664, which are hereby incorporated by reference in their entireties.

Replacement of the traditional wiring harness within the mirror assembly with continuous elongate middle components allows considerable flexibility in design. Not only are the number of components reduced but the number of electrical connections are also reduced. Traditional wiring harnesses include stranded wiring having connectors pressed or other wise attached to their ends. In contrast, with the use of continuous metal strips a number of connections can be eliminated. The metal strips can be constructed such that their ends are dimensioned so as to form connectors that can plug directly into the main vehicle wiring harness at one end and into motor mechanisms lights or other accessories within the mirror head at their other ends.

FIG. 7 shows a second embodiment of the invention in which a non-pivoting mirror head is used. With this embodiment of the invention power lies in the form of an elongate metal strips are able to transmit power directly from a wiring harness terminator located adjacent the mirror base to electrical components within the mirror head.

Thus it can be seen that by replacing a traditional wiring harness within a mirror assembly with elongate metal strips arranged to function as power lines significant advantages can be achieved in the mirror construction. The number of parts can be reduced, a number of electrically connections can be reduced, and the power lines can provide a structful role whether used with or without foam.

Australian provisional patent application PR3955 titled "Vehicle external mirror wiring integration" discloses a pivot assembly having contacts mounted on detent surfaces for transmission of power from the base to the head. These features and other features disclosed in PR3955 could be used with the present invention and the disclosure of PR3955 is herewith incorporated in its entirety into this specification.

Australian provisional patent application PR3953 titled "Modular pivot using central pivot pin" discloses a pivot mechanism using a solid pivot pin. This features and other features disclosed in PR3953 are/could be used with the present invention and the disclosure of PR3953 is herewith incorporated in its entirety into this specification.

Australian provisional patent application PR8300 titled "External vehicle mirror having self-loading pivot" discloses a mirror assembly having a self-loading pivot mechanism wherein initial rotation of the mirror head with respect to the mirror base causes pre-loading of a spring. These features and other features disclosed could be used with the present invention and the disclosure of PR8300 is herewith incorporated in its entirety into this specification.

International Application No. PCT/AU00/00413 titled "Method of producing a plastic moulded part including a film covering" discloses a method of forming a moulding component comprising an outer thin film component with an adhered moulded shell. The method of that disclosure could be used to mould hollow form components that may be used with this invention (for instance for the shell of the head and base) and the disclosure of this application is incorporated herewith in its entirety.

Australian provisional patent application PR6683 titled "Foldable vehicle external mirror having auxiliary mirror" discloses a vehicle external mirror having an auxiliary mirror mounted to a distal side of the mirror head. The auxiliary mirror provides rear vision when the mirror head is in its folded position. This features and other features disclosed in PR6683 are/could be used with the present invention and the disclosure of PR6683 is herewith incorporated in its entirety into this specification.

Australian provisional patent application number PR6204 titled "Mirror Heater" discloses an automatic heating control system and apparatus for heating the surface of a mirror to de-ice or de-fog the mirror. The heating process is initiated upon starting the vehicle engine, and is conducted in accordance with a pre-set timing sequence and in accordance with an actual measured temperature of the mirror. These features and other features disclosed in this document could be used with the present invention and the disclosure of PR6204 is hereby incorporated in its entirety into this current specification.

It would also be possible to incorporate other components with the mirror base (mounting bracket) and or mirror head. Such components include electronic sensors such as proximity sensors to determine if the vehicle mirror is close to an obstruction, sensors that sense external temperature and humidity, and sensors incorporated with the car security system such as motion detectors. Other various electronic equipment may be incorporated into the mirror base (mounting bracket) such as lights used to light the area around the vehicle, or lights that may be controlled from within the vehicle that enable the light to be moved so as to provide directional lighting. Speakers and microphones used to communicate to people external of the vehicle may also be incorporated as well as antennas for various apparatus such as mobile phones, GPS devices and other radio communication devices. In addition, transmitters may be incorporated into the mounting bracket which are used for controlling external objects such as garage doors or providing radio transmissions which may be used, for example, to track or locate the vehicle. Other electronic devices such as automatic toll payment systems or remote transaction systems may be incorporated into the mounting bracket to enable electronic registration of various toll payments.

Cameras may also be incorporated into the mirror base (mounting bracket) which are both forward and rearward looking which are designed to continuously record digital images and to store those images either on command or as a result of an accident or incident. Motion sensors including accelerometers can be used to determine the occurrence of an accident or incident so that images before and after the event are stored.

While the present invention has been described in terms of a preferred embodiment in order facilitate better understanding of the invention, it should be appreciated that various modifications can be made without departing from the principles of the invention. Therefore, the invention should be understood to include all such modifications within its scope.

The claims defining the invention are as follow:

1. A vehicle external mirror assembly comprising:
    a mirror head adapted to support a mirror, the mirror head having an external shell;
    a first foam core providing support for the shell;
    a mirror base adapted for mounting to a vehicle, the mirror base connected to the mirror head or integral with the mirror head;
    a plurality of electrical conductors disposed within the first foam core,
    wherein the conductors are arranged and constructed to diffuse stress within the foam; and
    a pivot assembly connected to the mirror head and a mirror base together for respective pivotal movement, wherein in use the conductors act to diffuse loads from the pivot assembly into the foam.

2. The mirror assembly of claim 1 wherein the electrical conductors are elongate metal strips.

3. The mirror assembly of claim 2 further comprising a neck connecting the mirror head and mirror base together, wherein the foam core and the electrical conductors extend through the neck.

4. The mirror assembly of claim 1 further comprising a means for electrically connecting the conductors disposed within the foam core to conductors within the mirror base.

5. The mirror assembly of claim 4 wherein the pivot assembly further comprises a base portion and a head portion having mutually shaped ramped surfaces which act to provide a detent mechanism and which provide the means for electrical connecting the conductors disposed within the foam core to conductors within the mirror base as to allow electrical power transmission through the pivot assembly.

6. The mirror assembly of claim 5 wherein the mirror base further comprises a second foam core.

7. The mirror assembly of claim 6 further comprising a plurality of electrical conductors disposed within the second foam core of the mirror base.

8. The mirror assembly of claim 7 wherein the pivot assembly further comprises a pivot pin extending through the base portion and the head portion such that the head portion can rotate with respect to the base portion about the pivot pin;
    characterized by the pivot pin being a solid pin.

9. The mirror assembly of claim 8 wherein the pivot pin comprises a solid cylinder.

10. The mirror assembly as in claim 1 wherein each electrical conductor is a continuous metal strip.

11. The mirror assembly of claim 1 further comprising:
    an electrical component within said mirror head;
    a vehicle wiring harness terminator adjacent said mirror base;
    wherein said plurality of electrical connectors transmit power between said vehicle wiring harness terminator and said electrical component within said mirror head;
    each of said plurality of electrical connectors having a central elongate power transmission portion, a first termination portion adapted to connect to said wiring harness terminator and a second termination portion adapted to connect to said electrical component.

12. The mirror assembly of claim 1 wherein said pivot assembly further comprises a pivot pin extending through said mirror base and said mirror head such that said mirror head can rotate with respect to said mirror base about said pivot pin, wherein said pivot pin is a solid pin.

* * * * *